United States Patent [19]

Lazarus et al.

[11] 4,070,342

[45] Jan. 24, 1978

[54] MANUFACTURE OF POLYESTERS

[75] Inventors: Stanley David Lazarus, Petersburg; John Walter Showers, Chester, both of Va.

[73] Assignee: Allied Chemical Corporation, Morris Township, N.J.

[21] Appl. No.: 752,483

[22] Filed: Dec. 20, 1976

[51] Int. Cl.$^2$ .......................... C08K 5/17; C08K 5/18; C08K 5/56

[52] U.S. Cl. .......................... 260/45.75 C; 260/42.56; 260/873

[58] Field of Search ............... 260/873, 42.56, 45.75 C

[56] References Cited

U.S. PATENT DOCUMENTS

| | | | |
|---|---|---|---|
| 3,383,353 | 5/1968 | Goto | 260/45.75 C |
| 3,519,595 | 7/1970 | Hermann et al. | 260/45.75 C |
| 3,579,609 | 5/1971 | Sevenich | 260/873 |
| 3,639,335 | 2/1972 | Fujii et al. | 260/45.75 C |
| 3,833,542 | 9/1974 | Lazarus et al. | 260/75 N X |
| 3,839,499 | 10/1974 | Jadamus et al. | 260/873 |
| 3,919,353 | 11/1975 | Castelnuovo et al. | 260/873 |
| 3,923,726 | 12/1975 | Benz | 260/42.56 X |

*Primary Examiner*—Sandra M. Person
*Attorney, Agent, or Firm*—Fred L. Kelly

[57] ABSTRACT

In a continuous process for production of polyester polymers, polymer additives are added to the process stream at a point where the polymer is molten by injecting a stable liquid dispersion formed from a liquid polyisobutene and the requisite polymer additives. The process is particularly useful in production of thermally stabilized polyesters wherein a stabilizing amount of a copper complex compound is incorporated therein.

2 Claims, No Drawings

MANUFACTURE OF POLYESTERS

BACKGROUND OF THE INVENTION

This invention relates to a continuous process for producing spinnable polyester polymers. More specifically, this invention relates to a continuous process for producing spinnable polyester polymers wherein solid polymer additives are added to the process stream at a point where the polymer is molten. In one preferred embodiment, the invention relates to a process for preparing an improved heat stable polyester polymer by late addition of a copper complex compound to the polymer.

Linear high-molecular weight polyethylene terephthalate film and fiber forming polyesters are well known. They are prepared commercially either by the ester interchange reaction between dimethyl terephthalate and a glycol or by the direct esterification process wherein terephthalic acid is reacted directly with ethylene glycol. These products and processes are well documented in U.S. Pat. Nos. such as 2,465,310; 3,050,533; 3,051,212; 3,427,287 and 3,484,410, which cover not only the basic products and processes but many improvements thereon. And though many improvements naturally have evolved from such a highly successful commercial product, such success generates more and more uses and such new uses as well as old ones create demands for a better product in today's commercial arena of positive competition.

Polyethylene terephthalate fibers and cords are known to exhibit excellent dimensional stability, that is, low extension or growth during service, as well as to have a high resistance to thermal degradation; however, in tires under high speed conditions under heavy load, loss of tensile strength is experienced due to high temperature conditions emanating under such conditions. The following patents are particularly pertinent to this problem:

U.S. Pat. No. 3,563,848 to R. S. Bhakuni et al. relates to the production of thermally stabilized polyesters. More particularly, this patent discloses an improved rubber structure reinforced with a polyester fiber modified with either a metal complex alone or in combination with a polycarbonate alone or in combination with an isocyanate, the modifier being present in the polyester prior to fiber formation.

More recently, U.S. Pat. No. 3,833,542 to S. D. Lazarus et al. discloses an improved high molecular weight linear polyester having a small amount of dichloro(di-2-pyridylamine) copper (II) or bis(di-2-pyridylamine) copper (II) chloride incorporated therein to improve thermal stability. This patent suggests late addition of the metal complex to the molten polymer in a continuous process; however, the liquid carrier for the metal complex, tris(nonyl phenyl)phosphite, is not very satisfactory because it causes the polymer to become gray in color.

Although these patents constitute an important contribution to the art, research in this field has continued, particularly with respect to continuous injection of solid additives into molten polyester. Those skilled in this art know that in conventional polymer chip spinning processes, it is possible to coat the chips with a polymer additive. However, this method cannot be used in a continuous process wherein polycondensation is followed directly be spinning of the molten polymer. Accordingly, the present invention is directed primarily to providing an improved continuous process for production of polyester polymers wherein the polymer additives are added to the process stream at a point where the polymer is molten, whereby the resultant molten polymer can then be used directly in the preparation of shaped articles, particularly fibers.

SUMMARY OF THE INVENTION

Briefly stated, the present invention relates to an improved continuous process for the production of a high molecular weight polyester polymer by reaction of an aromatic dicarboxylic acid or lower alkyl ester thereof with a glycol containing 2 to 10 carbon atoms per molecule and subsequent polycondensation of the reaction product in the presence of a catlyst to form a polymer melt, the improvement comprising forming a stable dispersion of a plurality of non-compatible substances comprising a liquid polyisobutene and a solid polymer additive, and continuously injecting the dispersion with mixing into the polymer melt following the catalytic polycondensation.

Preferably, the liquid polyisobutene has a viscosity of about 3 to 70 poise at 20° C., the solid polymer additive is ground to an average particle size of 2 microns or less in diameter, and the solid polymer additive is dispersed in the polyisobutene at a concentration of 10 to 60 weight percent based on the total weight of the dispersion.

The preferred polyisobutenes may be produced by catalytic polymerization of an isobutene rich stream. They are commercially available as polybutenes from Chevron Chemical Company, and several grades are available having different viscosities. The backbone of the commercial polybutene is essentially that of polyisobutene, although some 1-butene and 2-butene may be incorporated. Each molecule contains one double bond in either the alpha or beta position.

The preferred polyesters are the linear terephthalate polyesters, i.e., polyesters of a glycol containing from 2 to 10 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4'-dibenzoic acid, or 2,8-dibenzofuran-dicarboxylic acid. The glycols may contain more than two carbon atoms in the chain, e.g, diethylene glycol, butylene glycol, decamethylene glycol, and bis-1,4-(hydroxymethyl)cyclohexane. Examples of linear terephthalate polyesters which may be employed include poly(ethylene terephthalate), poly(butylene terephthalate), poly(ethylene terephthalate/5-chloroisophthalate) (85/15), poly(ethylene terephthalate/5-[sodium sulfo]isophthalate) (97/3), poly(cyclohexane-1,4-dimethylene terephthalate), and poly(cyclohexane-1,4-dimethylene terephthalate/hexahydroterephthalate) (75/25).

The direct esterification of the aromatic dicarboxylic acid and/or the lower alkyl esters thereof and the glycol can start at a temperature as low as 200° C. and range up to 300° C. and at atmospheric and superatmospheric pressures ranging up to 500 psig. The reaction, either the direct esterification or ester interchange, is carried out in the absence of oxygen-containing gas. Preferably, the reaction temperature ranges from about 230° to about 280° C. and at a pressure ranging from about 50 to 250 psig. The reaction time will vary depending upon the reaction temperature and pressure. The amount of glycol is reacted with the aromatic didescribed above, is continuously metered into the polymer transfer line. The polymer and Dispersion A are intimately mixed by passing through a 12-inch stationary mixer immediately before the polymer passes to the spinning block. Yarn is then continuously spun and drawn to form 1300 denier, 192 filament, tire yarn. The yarn has an intrinsic viscosity of 0.90 to 0.95 dl. per gram and less than 12 equivalents of carboxyl end groups per $10^6$ grams. The yarn is slightly green in color. It is overfinished with a composition containing an adhesion promoter, twisted into 3 ply, 9 t.p.i. tire cord, dipped in a blocked diisocyanate-epoxide emulsion, stretched at 420° F., dipped in a resorcinol-formaldehyde-vinyl pyridine polymer emulsion, stretched at 440° F. and calendered with rubber to make fabric for tire building. Tires made with this fabric are characterized by excellent durability when run on the wheel test stand.

Similar results are obtained when the copper II dichloro bis(2,2'dipyridyl) is replaced with an equivalent amount based on copper content of a compound selected from the goup consisting of copper II dichloro 2,2'-dipyridyl, copper II dichloro oxamide, copper II dichloro 1,10-phenanthroline, and copper II dichloro ethylene diamine.

EXAMPLE 2

A series of dispersions are prepared in accordance with the preparation of Dispersion A of Example 1 except that a series of polyisobutenes manufactured by Chevron Chemical Company is used. These commercial materials differ in molecular weight and viscosity and are designated by Chevron as "Polybutenes." The following table indicates typical viscosity of various Chevron Polybutenes

|  | Viscosity, Poise at about 20° C. |
| --- | --- |
| Polybutene No. 6 | 0.6 |
| Polybutene No. 8 | 3.0 |
| Polybutene No. 12 | 25.0 |
| Polybutene No. 16 | 39.0 |
| Polybutene No. 18 | 66.0 |
| Polybutene No. 24 | 356.0 |
| Polybutene No. 32 | 1188.0 |

It is found that dispersions made as described in Example 1, but with Polybutene No. 6 are unsuitable for use in the process of the present invention because such dispersions are not stable, i.e., settling of solids quickly occurs. With use of Polybutene No. 8, 12, and 16, stable dispersions can be prepared, i.e., no settling of solids occurs when dispersions are allowed to stand for 3 days. Moreover, dispersions made with Polybutenes No. 12 and 16 are very stable, i.e., no settling of solids occurs when the dispersions are allowed to stand for 14 days. Polybutene 18 is too viscous to prepare dispersions at 20° C.; however, stable dispersions can be prepared if the Polybutene is heated to about 80° C. Polybutenes 24 and 32 are too viscous for use in the process of this invention.

EXAMPLE 3

The procedure of Example 1 is followed except that finely divided titanium dioxide sold by American Cyanamid Company as UNITANE-0-310, is used to prepare the dispersion instead of the copper complex compound of Dispersion A. Microscopic examination of the resulting dispersion reveals no agglomerates greater than 2 microns in diameter, and the dispersion is very stable. The resulting yarn is white in color. Microscopic examination of the yarn revealed the dispersion of the $TiO_2$ in the yarn to be excellent. Similar excellent results are obtained when a mixture of titanium oxide with the copper complex compound of Dispersion A are used to produce a dispersion for use in the process of the present invention.

EXAMPLE 4

The procedure of Example 3 is followed except that a 230 denier yarn is produced. This yarn is knitted into a sleeve and samples are dyed with conventional dyes used to dye polyester. Dyed uniformity of the samples is excellent.

EXAMPLE 5

This example demonstrates a suitable procedure for preparation of a typical copper complex compound used in the process of the present invention.

About 4 parts of $CuCl_2$ is dissolved in 79 parts of anhydrous ethanol. This solution is filtered to remove insolubles. Then, a solution of 9.3 parts of 2,2' dipyridyl in 158 parts of anhydrous ethanol is slowly added to the $CuCl_2$ solution, with stirring. A precipitate is formed. It is filtered and washed with ethanol and dried. The product is copper II dichloro 2,2' dipyridyl.

We claim:

1. In a continuous process for melt-spinning yarn from a high molecular weight polyethylene terephthalate polymer, the improvement which consists of continuously incorporating in said polymer a stabilizing amount of a copper compound selected from the group consisting of copper II dichloro 2,2'-dipyridyl, copper II dichloro bis(2,2'-dipyridyl), copper II dichloro oxamide, copper II dichloro 1,10-phenanthroline, and copper II dichloro ethylene diamine, said process being further characterized in that said copper compound is incorporated in said polymer when said polymer is in the molten state immediately prior to spinning, by forming a stable dispersion comprising a liquid polyisobutene and said copper compound and injecting the dispersion with mixing into said molten polymer, said liquid polyisobutene having a viscosity of 3 to 70 poises at 20° C., and said dispersion containing 10 to 60 weight percent of said copper compound, whereby said yarn has an intrinsic viscosity of 0.90 to 0.95 dl. per gram and less than 12 equivalents of carboxyl end groups per $10^6$ grams of yarn, said yarn being particularly useful to make fabric for tire building.

2. In a continuous process for melt-spinning yarn from a high molecular weight polyethylene terephthalate polymer, the improvement which consists of continuously incorporating in said polymer a stabilizing amount of a copper compound consisting of copper II dichloro 1,10-phenanthroline, said process being further characterized in that said copper compound is incorporated in said polymer when said polymer is in the molten state immediately prior to spinning, by forming a stable dispersion comprising a liquid polyisobutene and said copper compound and injecting the dispersion with mixing into said molten polymer, said liquid polyisobutene having a viscosity of 20 to 45 poise at 20° C., and said dispersion containing 10 to 60 weight percent of said copper compound, whereby said yarn has an intrinsic viscosity of 0.90 to 0.95 dl. per gram and less than 12 equivalents of carboxyl end groups per $10^6$ grams of yarn, said yarn being particularly useful to make fabric for tire building.

* * * * *